No. 871,566. PATENTED NOV. 19, 1907.
F. & T. CHIPERA.
SHAKING MECHANISM FOR SEPARATORS.
APPLICATION FILED AUG. 16, 1906.
2 SHEETS—SHEET 1.
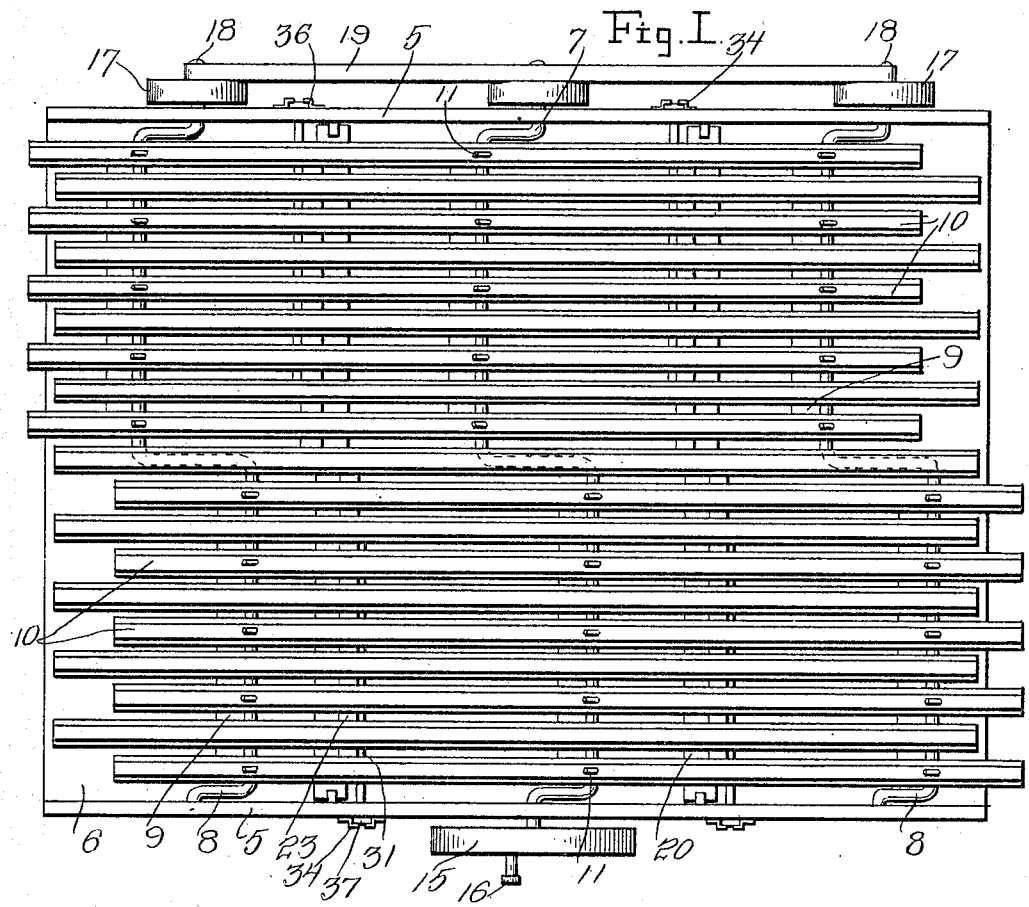
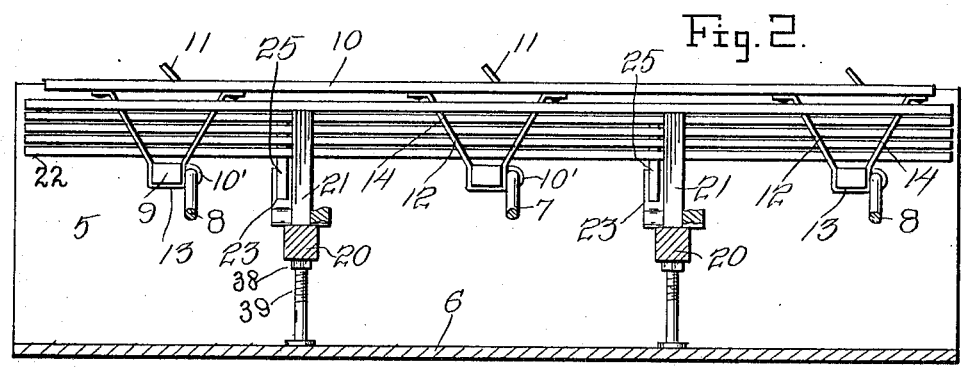

No. 871,566. PATENTED NOV. 19, 1907.
F. & T. CHIPERA.
SHAKING MECHANISM FOR SEPARATORS.
APPLICATION FILED AUG. 16, 1906.

2 SHEETS—SHEET 2.

Witnesses
C. K. Reichenbach
F. B. MacNab

Inventors
F. Chipera
T. Chipera
By Chandler & Chandler
Attorneys

UNITED STATES PATENT OFFICE.

FRANK CHIPERA AND THOMAS CHIPERA, OF BRECKENRIDGE, MINNESOTA.

SHAKING MECHANISM FOR SEPARATORS.

No. 871,566.      Specification of Letters Patent.      Patented Nov. 19, 1907.

Application filed August 16, 1906. Serial No. 330,851.

*To all whom it may concern:*

Be it known that we, FRANK CHIPERA and THOMAS CHIPERA, citizens of the United States, residing at Breckenridge, in the county of Wilkin, State of Minnesota, have invented certain new and useful Improvements in Shaking Mechanism for Separators; and we do hereby declare the following to be a full, clear, and exact description of the invention, such as will enable others skilled in the art to which it appertains to make and use the same.

This invention relates to shakers for grain separators, threshing machines and the like and has for its object to provide a construction of this nature which will act efficiently to loosen bundles of straw.

A novel feature of this invention resides in the fact that an adjustable rake bed is provided, by means of which the throw of the rake bars above the rake bed may be regulated, if so desired.

Furthermore the invention resides in the provision of a rake bed formed in sections which may be tilted to locate the sides of the rake bed above the level of the middle thereof to cause the straw to be fed to the center of the bed, thereby thoroughly loosening up the bundles of straw.

A still further object of the invention is to so construct the supports for the bars of the rake bed that these supports will maintain a vertical position and therefore not interfere with the rake bars.

Figure 3:
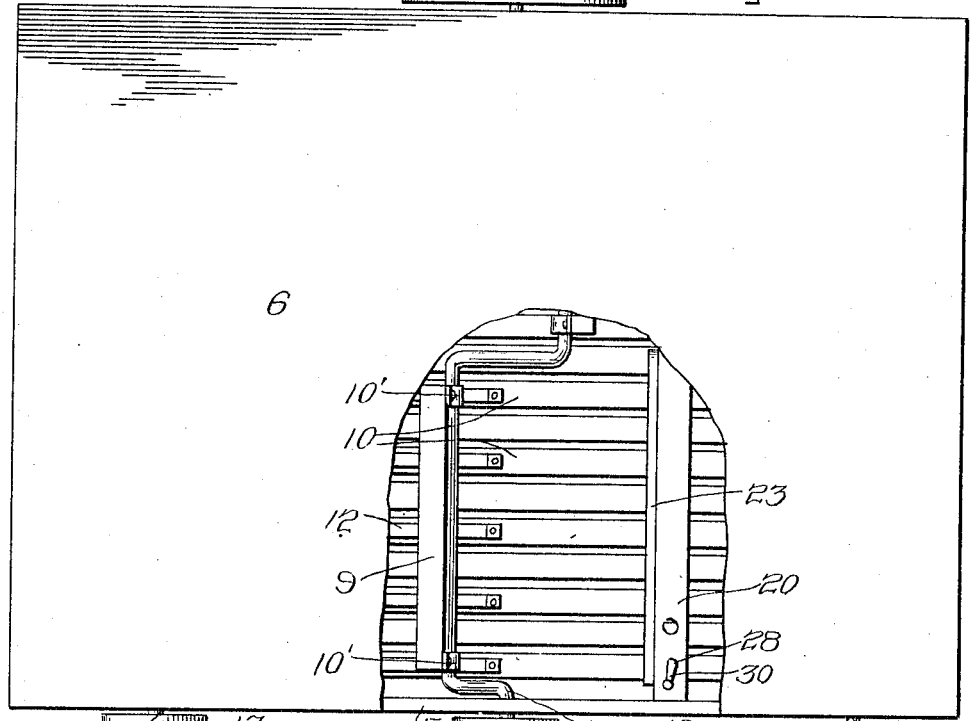
Figure 4:
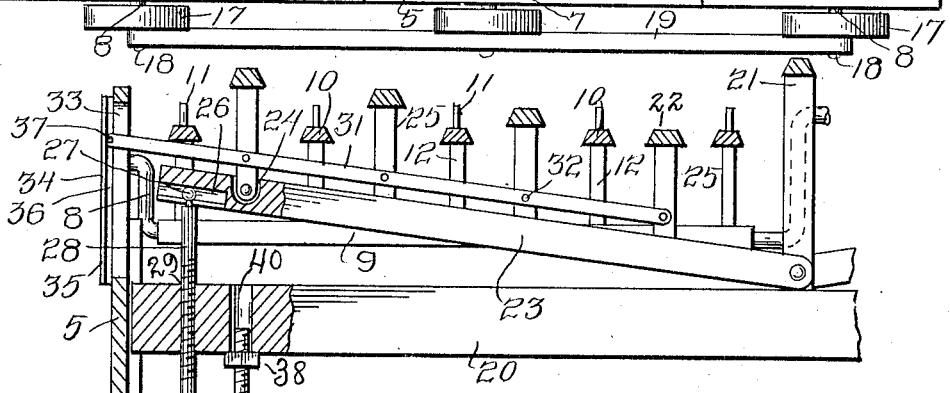

With these and other objects in view, the invention consists in the construction and arrangement of parts shown in the accompanying drawings in which Figure 1 is a top plan view of the invention. Fig. 2 is a vertical, longitudinal, sectional view through the mechanism. Fig. 3 is a bottom plan view of the same, the bottom of the casing being shown partly broken away and Fig. 4 is a detailed, transverse, sectional view through one side of the mechanism showing the means for adjusting the rake bed.

Referring more specifically to the drawings, the numeral 5 denotes the sides of the casing in which the mechanism is arranged and 6 the bottom of the same. Journaled in the said sides of the casing intermediate of the ends thereof is a multiple crank shaft 7 and in the said sides adjacent each end of the casing, is journaled a multiple crank shaft 8. The numeral 9 denotes rake heads which are connected with and supported by the cranked portions of the multiple crank shafts 7 and 8, the said connection being made by means of suitable bearing boxes 10'. There are a series of these rake heads for each series of cranked portions of the shafts 7 and 8 and the cranks of the said shafts extend in opposite directions, so that the series of rake heads will be moved alternately, upwardly and downwardly.

Supported by each series of rake heads 9 is a series of parallel rake bars 10 which are provided at intervals under their upper edges with rake teeth 11. Said bars are supported by means of brackets 12, which comprise each a strip of metal bent upon itself as at 13 to form spaced portions which lie upon opposite sides of the respective rake heads which are secured thereto in any suitable manner, said spaced portions being bent to extend in diverging planes as at 14 above the upper edges of the said head and secured to the under edges of the respective rake bars 10 in any suitable manner.

In order that the shafts 7 and 8 may be driven to operate the rake mechanism as above described, a crank wheel 15 is mounted upon the shaft 7 and is provided with a crank pin 16 for the attachment of the connecting rod, therewith from any suitable source of power, whereby the said shaft may be rotated.

The crank wheel 15 above mentioned is located at one end of the shaft 7 and located at the opposite end of the said shaft and at the corresponding ends of the shaft 8 are crank disks 17 carrying crank pins 18 and connecting the crank pins of the crank disks 17 is a connecting bar 19, it being understood that when the shaft 7 is rotated, shafts 8 will also be rotated and in the same direction.

Mounted at its ends in the sides 5 of the casing, adjacent each end thereof, and intermediate the shaft 7 and the adjacent shaft 8 is a beam 20. A standard 21 is supported by each of the beams intermediate the ends thereof and supported by the said standards at their upper ends is one of a series of bars 22 which constitute the rake bed, the said bars being in parallel relation with respect to the rake bars 10. Hingedly connected at their inner ends to the standards 21 upon opposite sides thereof and extending in a vertical plane with respect to the beam 20 are beams 23. Each of the beams 23 is recessed at intervals in its upper edge as at 24 and pivoted at their lower ends in each of the said recesses 24 is a standard 25. Supported by the corresponding standards and rake bars are the remaining bars 22 of the rake bed.

In order that the beams 23 may be adjusted and cause them to assume an inclined position with their outer ends above the level of their inner hinged ends, each of the said beams is provided in its under side and at its outer end with an interiorly enlarged recess 26 in which is engaged a ball end 27 of a threaded adjusting rod 28, said rod being engaged through a bore 29 in the beam 20 and provided at its lower end with a crank handle 30 by means of which it may be rotated to raise and lower the said outer end of the beam 23.

As a means for holding standards in an upright or vertical position, a bar 31 is pivotally engaged as at 32 with the standards supported by each beam 23 and adjacent the lower end of the said standards and has its outer end extending through a slot 33 formed adjacent the side 5 of the casing in which the mechanism is mounted. Secured upon the outer sides of the casing upon each side of each slot 33 formed therein is a guide 34 including a right-angularly extending portion 35 which forms together with the adjacent portion of the side of the casing, a guide channel, 36. Each bar 31 is provided at its said outer end with a pin 37, the ends projecting beyond the sides of the bar in the guide channel 36, it being understood that by this means, when the beams 23 are adjusted the standards 25 will be simultaneously moved to assume a vertical position with respect to the beam 20.

As shown in the drawings, the beam 20 has a fixed elevation, but when it is desired, adjusting means may be provided at each end thereof for raising and lowering said beam together with the beams 23 which are supported thereby, such adjusting means being arbitrarily shown as nuts 38 threaded upon the ends of vertical supporting standards 39, the upper ends of the latter being extended into vertical openings 40 provided in the beams 20, said beams resting upon said nuts as supports.

From the foregoing, it will be seen that the side of the rake bed may be elevated to a position above the center thereof to feed the straw toward the center of the bed thoroughly loosening the bundles and that even with this adjustment, the movement of the rake bars will not be interfered with.

What is claimed is:—

1. A shaking mechanism comprising a bed, a series of spaced parallel rake bars supported therein for reciprocating movement, means for reciprocating said rake bars, a second series of rake bars disposed alternately between the bars of said first named series and adapted to be held stationary, and means for simultaneously adjustably moving said last named bars to vary the transverse angular plane thereof as a series with relation to said first named bars.

2. A shaking mechanism comprising a bed, a series of spaced parallel rake bars supported therein for reciprocating movement, means for reciprocating said rake bars, a second series of rake bars disposed alternately between the bars of first named series and adapted to be held stationary, means for effecting a simultaneous vertical adjustment of said last named bars, and independent means for simultaneously adjustably moving said last named bars to vary the transverse angular plane thereof as a series with relation to said first named bars.

3. A shaking mechanism comprising a bed, a series of spaced parallel rake bars supported therein, means for reciprocating said rake bars, a second series of rake bars, disposed alternately between the bars of said first named series and adapted to be held stationary, means for simultaneously adjustably moving said last named bars to vary the angular plane thereof as a series with relation to said first named bars, and means for guiding said last named bars individually in a vertical plane of movement during the action of said adjusting means.

4. A shaking mechanism comprising a bed, a series of spaced parallel rake bars supported therein for reciprocating movement, means for reciprocating said rake bars, a transverse pivoted beam, a second series of rake bars supported from said beam and disposed alternately between the bars of first named series, and means for moving said beam to selected positions about its pivot.

5. A shaking mechanism comprising a bed, a series of spaced parallel rake bars supported therein for reciprocating movement, means for reciprocating said rake bars, a transverse pivoted beam, standards pivoted at their lower ends to said beam at points between said rake bars, rake bars supported on said standards, a transverse bar having pivotal connection along its body portion with each of said standards, said bar having a projecting end, means for moving said beam to selected positions and means for guiding the movement of the projecting end of said transverse bar in a vertical plane during the action of said adjusting means.

In testimony whereof, we affix our signature, in presence of two witnesses.

FRANK CHIPERA.
THOMAS CHIPERA.

Witnesses:
P. E. TRUAX,
R. P. GLOVER.